US010773269B2

(12) United States Patent
DeJong

(10) Patent No.: US 10,773,269 B2
(45) Date of Patent: Sep. 15, 2020

(54) DISPENSING PUMP WITH SKIRT SPRING

(71) Applicant: Silgan Dispensing Systems Corporation, Grandview, MO (US)

(72) Inventor: David L. DeJong, Ogden, UT (US)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 15/936,569

(22) Filed: Mar. 27, 2018

(65) Prior Publication Data

US 2018/0214899 A1     Aug. 2, 2018

Related U.S. Application Data

(63) Continuation of application No. 15/105,646, filed as application No. PCT/US2014/072932 on Dec. 31, 2014, now Pat. No. 9,937,509.

(60) Provisional application No. 61/926,486, filed on Jan. 13, 2014.

(51) Int. Cl.
| *F16F 1/02* | (2006.01) |
| *B05B 11/00* | (2006.01) |
| *F04B 13/00* | (2006.01) |
| *F04B 15/02* | (2006.01) |
| *F04B 19/20* | (2006.01) |
| *F04B 53/10* | (2006.01) |

(52) U.S. Cl.
CPC ...... *B05B 11/3023* (2013.01); *B05B 11/3001* (2013.01); *B05B 11/304* (2013.01); *B05B 11/3047* (2013.01); *B05B 11/3069* (2013.01); *B05B 11/3077* (2013.01); *F04B 13/00* (2013.01); *F04B 15/02* (2013.01); *F04B 19/20* (2013.01); *F04B 53/10* (2013.01)

(58) Field of Classification Search
CPC ............ B05B 11/3001; B05B 11/3023; B05B 11/3004; B05B 11/304; B05B 11/3047; B05B 11/3069; B05B 11/3077; F16F 1/28; F16F 1/32; F16F 1/025; F04B 53/10; F04B 15/02; F04B 13/00; F04B 19/20
USPC .... 267/158, 160, 161, 164, 166.1, 238, 239, 267/288, 290; 222/321.1–321.9, 380, 222/383.1, 340, 341
See application file for complete search history.

(56) References Cited

U.S. PATENT DOCUMENTS

| 2,117,264 A * | 5/1938 | Workman ............. F16F 1/3732 |
| | | 267/141.1 |
| 2,171,185 A | 8/1939 | Maier |
| 2,597,650 A | 5/1952 | Maehren |
| 2,947,529 A | 8/1960 | Schwartz et al. |
| 3,536,315 A | 10/1970 | Jenkin |
| 3,598,389 A | 8/1971 | Kohler |

(Continued)

FOREIGN PATENT DOCUMENTS

WO     2013142871 A1     9/2013

*Primary Examiner* — Charles Cheyney
(74) *Attorney, Agent, or Firm* — Barlow, Josephs & Hollmes, Ltd.

(57) ABSTRACT

A dispensing pump for liquids, viscous materials, foams, gels, etc. includes a resilient plastic skirt spring so that the entire pump can be more easily recycled. The skirt spring comprises a plurality of concentric nesting rings sequentially decreasing in diameter from a base ring to a top ring to form a conical shape wherein adjacent rings are interconnected by spaced bridge segments and the bridge segments are staggered at each sequential ring.

18 Claims, 3 Drawing Sheets

(56) References Cited

U.S. PATENT DOCUMENTS

| | | | | |
|---|---|---|---|---|
| 3,602,490 | A * | 8/1971 | Mueller | G01V 1/181 |
| | | | | 267/161 |
| 4,386,478 | A * | 6/1983 | Belokin | A01M 3/027 |
| | | | | 124/16 |
| 4,840,457 | A * | 6/1989 | Remer | G11B 7/0932 |
| | | | | 359/824 |
| 4,858,897 | A * | 8/1989 | Irifune | F16D 3/72 |
| | | | | 267/181 |
| 5,062,619 | A * | 11/1991 | Sato | F16F 1/02 |
| | | | | 267/154 |
| 5,673,824 | A * | 10/1997 | Evans | B05B 11/0005 |
| | | | | 222/321.1 |
| 6,126,038 | A | 10/2000 | Olegnowicz | |
| 6,170,713 | B1 | 1/2001 | Schultz | |
| 6,932,246 | B2 | 8/2005 | Crosnier et al. | |
| 6,948,639 | B2 * | 9/2005 | Albisetti | B05B 11/0062 |
| | | | | 222/321.2 |
| 7,717,302 | B2 | 5/2010 | Crosnier et al. | |
| 8,876,094 | B1 * | 11/2014 | Ridgeway | F16F 1/34 |
| | | | | 267/160 |
| 9,016,527 | B2 | 4/2015 | Faneca Llesera | |
| 2008/0000933 | A1 | 1/2008 | Marelli | |
| 2009/0140009 | A1 * | 6/2009 | Chen | B05B 11/3026 |
| | | | | 222/207 |
| 2010/0002977 | A1 * | 1/2010 | Saenz De Ugarte | F16C 27/04 |
| | | | | 384/581 |
| 2015/0090741 | A1 | 4/2015 | Laffey | |
| 2016/0186833 | A1 | 6/2016 | Kato et al. | |
| 2016/0332181 | A1 | 11/2016 | DeMan | |

\* cited by examiner

DISPENSING PUMP WITH SKIRT SPRING

CROSS-REFERENCE TO RELATED APPLICATIONS

This Application is a continuation of U.S. application Ser. No. 15/105,646, filed Jun. 17, 2016, which is a Section 371 National Stage Filing of PCT/US2014/072932 filed Dec. 31, 2014 (now expired), which claims the benefit of US Provisional Application No. 61/926,486 filed Jan. 13, 2014 (now expired).

BACKGROUND OF THE INVENTION

(1) Field of the Invention

The instant invention relates to a dispensing pump for liquids, viscous flowable materials, foams, gels, etc. and more particularly to a dispensing pump with a skirt-shaped plastic spring.

(2) Description of Related Art

Dispensing pumps are generally known in the art. They generally comprise a body portion which is seated on the neck of a container, a co-acting nozzle portion which slides relative to the body portion, and a spring structure which biases the co-acting nozzle portion to its normal rest position. To dispense the material in the container, the user manually depresses the nozzle which forces the material from the inside of the body portion. When the nozzle is released, the spring forces the nozzle portion back to its normal resting position.

SUMMARY OF THE INVENTION

An exemplary embodiment of a dispensing pump according to the present invention generally comprises a base portion, an inlet valve, a piston valve, a resilient polymer skirt spring, a spring guide and a pump actuator.

The base portion has a bottom wall and an upwardly extending sidewall. The bottom wall includes a centrally located entrance orifice which is received in communication with the neck of a container (not shown) having the material to be dispensed held within. The base portion further has a flow conduit extending upwardly from the inner surface of the bottom wall which surrounds the entrance orifice.

The inlet valve is received within the entrance orifice and is slidably movable between a normal closed position where the inlet valve is seated within the entrance orifice and an open position where the inlet is unseated from the entrance orifice to allow material to flow into the flow conduit from the container.

The piston valve has a lower end received within the flow conduit, an upper end and an outlet opening adjacent the upper end.

The skirt spring comprises a plurality of concentric nesting rings sequentially decreasing in diameter from a base ring to a top ring wherein adjacent rings are each interconnected by a pair of spaced opposing bridge segments. In order to provide spring force, the bridge segments are staggered at each sequential ring to provide cantilevered segments as the rings nest together in compression. In the exemplary embodiment, the opposing bridge segments are spaced 180 degrees apart at each tier. Further, the opposing bridge segments are staggered 90 degrees at each sequential ring tier. In accordance with the teachings of the invention, the skirt spring is preferably molded from a polymer material similar to that of the other pump structures so that the entire dispensing pump can be easily recycled. The metal springs in prior art devices forced disassembly of the pump prior to recycling and thus restricted both use and disposal of the prior art device.

The skirt spring further includes an upper wall portion extending inwardly from the top ring and an inner annular piston wall extending downwardly from the upper wall. The skirt spring is received within the base portion with the base ring seated on the bottom wall, and such that the upper end of the piston valve is concentrically received within the inner piston wall, and further such that the outer surface of the inner piston wall is disposed concentrically within the flow conduit. In this regard, the piston valve is slidably movable within the flow conduit and within the inner piston wall, and the upper end of the piston valve engages and cooperates with the inner piston wall to form an outlet valve.

The guide structure has a top wall, an outer sidewall depending downwardly and outwardly from the top wall, and an inner annular wall depending downwardly from the top wall. The top wall also includes an outlet orifice located within the inner annular wall. The guide structure is received within the base portion wherein the terminal outer edge of the outer sidewall is slidably received within the outer sidewall of the base portion, and the inner annular wall captures the top ring of the skirt spring. This arrangement permits the guide structure to be slidably movable within the base portion and to guide compression and expansion of the skirt spring.

The pump actuator includes a top wall, downward depending sidewalls and a dispensing orifice with an internal conduit. The pump actuator is received over the guide structure and within the sidewall of the base portion where the internal conduit of the dispensing orifice communicates with the outlet orifice of the guide structure and the pump actuator is slidably movable relative to the base portion.

In operation, forcible downward compression of the pump actuator causes a corresponding downward movement of the guide structure, a corresponding guided compression of the skirt spring, a corresponding sliding movement of the inner piston wall of the skirt spring relative to the upper end of the piston valve to open the outlet valve and a corresponding downward sliding movement of the piston valve to force material within the flow conduit to flow through the outlet valve, through the outlet orifice of the guide structure and finally out through the dispensing orifice of the nozzle.

Upon the subsequent release of the pump actuator, the skirt spring expands causing a forcible upward movement of the guide structure and pump actuator, a corresponding sliding movement of the inner piston wall of the skirt spring relative to the upper end of the piston valve to close the outlet valve, and a corresponding upward sliding movement of the piston valve, which in turn creates a vacuum pressure within the flow conduit drawing the inlet valve from its normally closed position to its open position and drawing material into the flow conduit through the inlet orifice.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
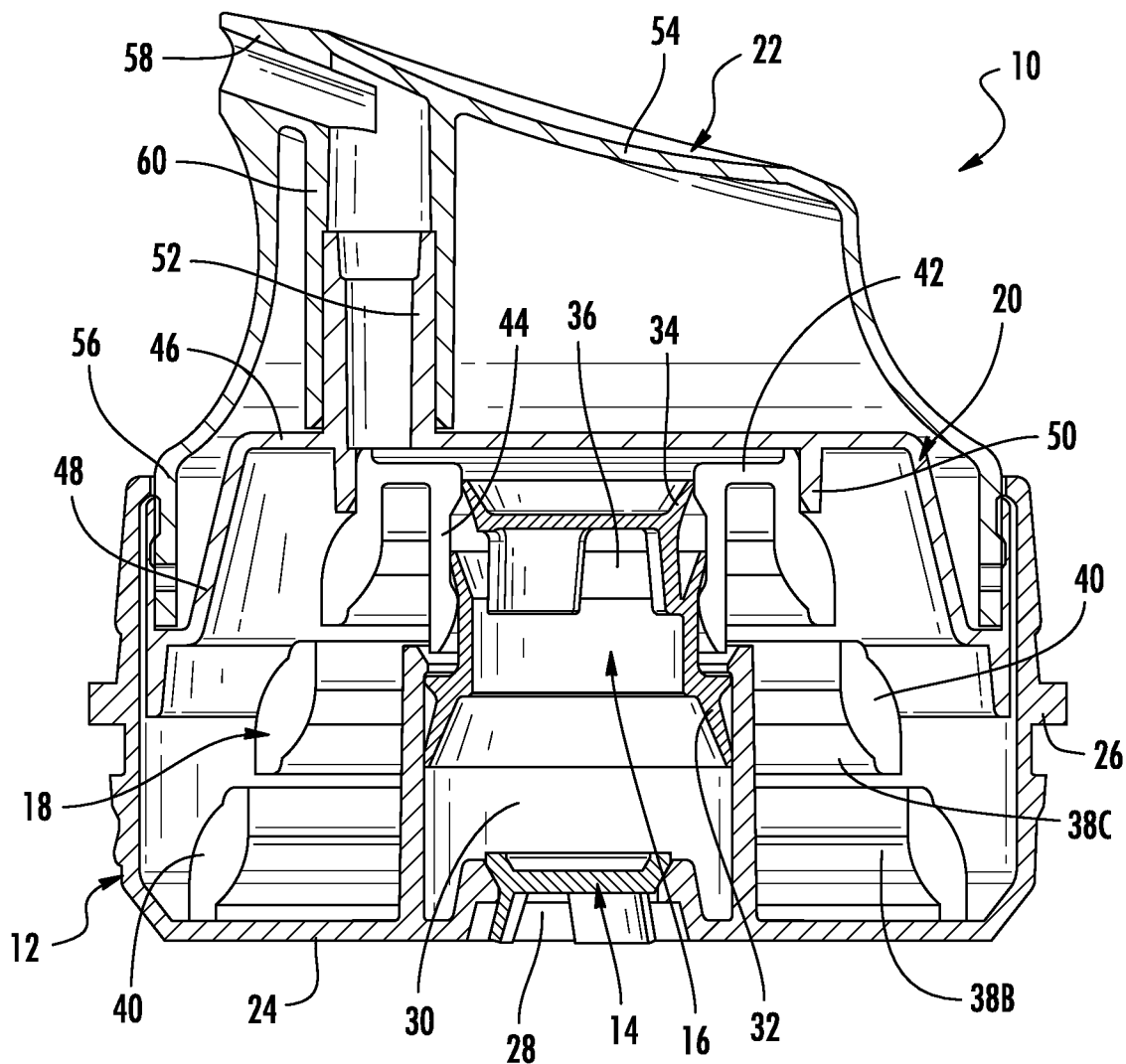
FIG. 1 is a cross-sectional view of an exemplary embodiment of the dispensing pump of the present invention.
Figure 2:
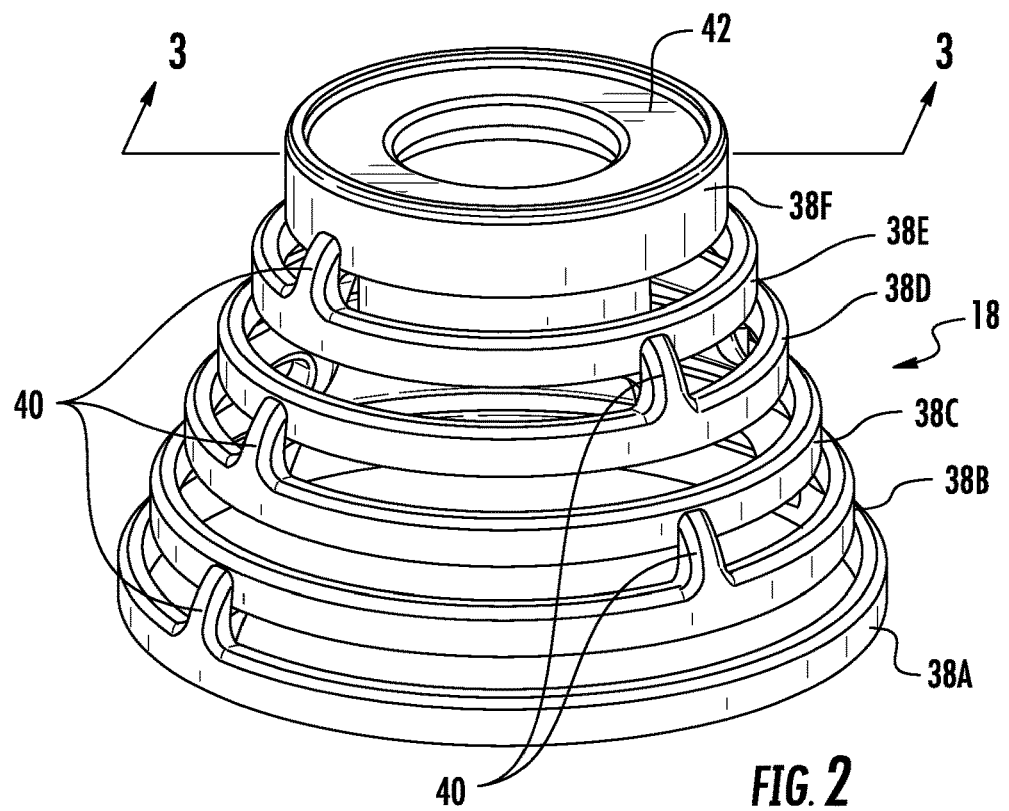
FIG. 2 is a perspective view of the skirt spring thereof.
Figure 3:
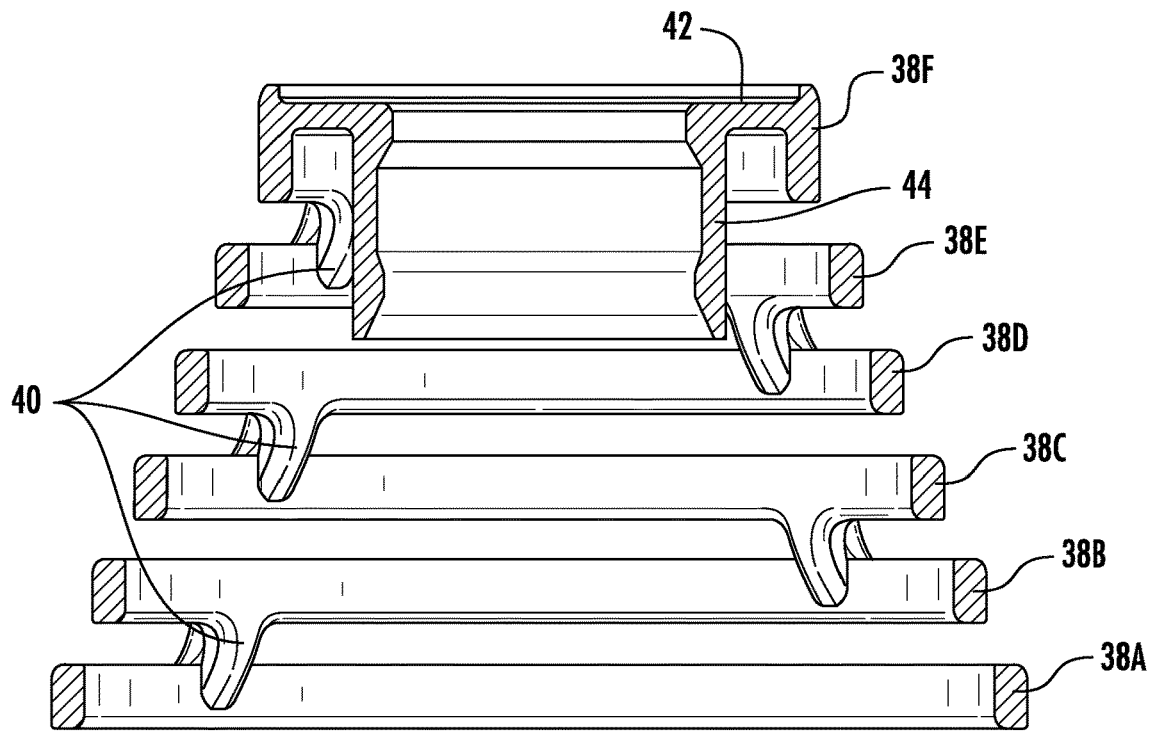
FIG. 3 is a cross-section view thereof taken along line 3-3 of FIG. 2.

Referring now to the drawings, an exemplary embodiment of the invention is generally indicated at 10 in FIG. 1. According to the present invention, the dispensing pump 10 generally comprises a base portion 12, an inlet valve 14, a piston valve 16, a resilient polymer skirt spring 18, a spring guide 20 and a pump actuator 22.

The base portion 12 has a bottom wall 24 and an upwardly extending sidewall 26. The bottom wall 24 includes a centrally located entrance orifice 28 which is received in communication with the neck of a container (not shown) having the material (not shown) to be dispensed held within. The dispensing pump 10 is useful for a variety of flowable materials, including, not limited to liquids, viscous flowable fluids, foams, gels, etc. The base portion 12 further has a flow conduit 30 extending upwardly from the inner surface of the bottom wall 24 which surrounds the entrance orifice 28.

The inlet valve 14 is received within the entrance orifice 28 and is slidably movable between a normal closed position where the inlet valve 14 is seated within the entrance orifice 28 and an open position where the inlet valve 14 is unseated from the entrance orifice 28 to allow material to flow into the flow conduit 30 from the container.

The piston valve 16 is generally cylindrical and has a lower end 32 received within the flow conduit 30, an upper end 34 and an outlet opening 36 adjacent the upper end 34.

Figure 4:
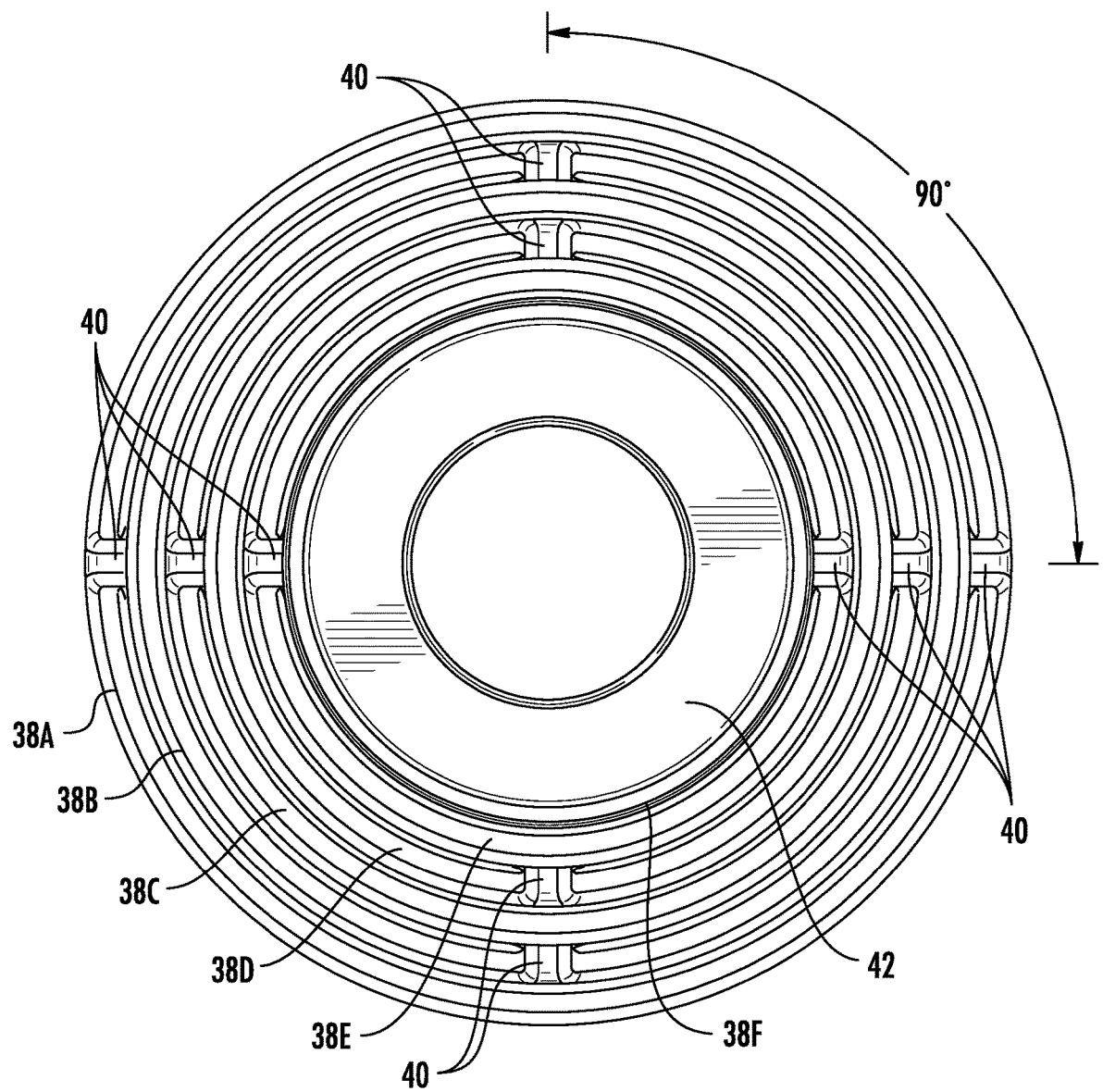
FIG. 4 is a top view thereof.

The skirt spring 18 comprises a plurality of concentric nesting rings 38 sequentially decreasing in diameter from a base ring 38A to a top ring 38F wherein adjacent rings are each interconnected by a pair of spaced opposing bridge segments 40A,40B. The inner and outer diameters of adjacent rings (38A-38B) are configured so that the smaller upper ring 38B can collapse and nest within the larger lower ring 38A. In order to provide spring force, the bridge segments 40 are staggered at each sequential ring to provide cantilevered spring segments as the rings 38 nest together in compression. In the exemplary embodiment, the opposing bridge segments 40 are spaced 180 degrees apart at each tier (see FIG. 4). Further, the opposing bridge segments 40 are staggered 90 degrees at each sequential ring tier (see also FIG. 4). In accordance with the teachings of the invention, the skirt spring 18 is preferably molded from a polymer material (such as polypropylene) similar to that of the other pump structures so that the entire dispensing pump 10 can be assembled from all plastic parts and thus, easily recycled. The metal spring in prior art devices forced disassembly of the pump prior to recycling and thus restricted both use and disposal of the prior art device. The nesting construction of the rings 38 reduces pump height and allows single action injection molding which is simple and cost effective.

The skirt spring 18 further includes an upper wall portion 42 extending inwardly from the top ring 38F and an inner annular piston wall 44 extending downwardly from the upper wall portion 42. The skirt spring 18 is received within the base portion 12 with the base ring 38A seated on the bottom wall 24, and such that the upper end 34 of the piston valve 16 is concentrically received within the inner piston wall 44, and further such that the outer surface of the inner piston wall 44 is disposed concentrically within the flow conduit 30. In this regard, the piston valve 16 is slidably movable within the flow conduit 30 and within the inner piston wall 44, and the upper end 34 of the piston valve 16 engages and cooperates with the inner piston wall 44 to form an outlet valve.

The guide structure 20 has a top wall 46, an outer sidewall 48 depending downwardly and outwardly from the top wall 46, and an inner annular wall 50 depending downwardly from the top wall 46. The top wall 46 also includes an outlet orifice 52 located within the inner annular wall 50. The guide structure 20 is received within the base portion 12 wherein the terminal outer edge of the outer sidewall 48 is slidably received within the outer sidewall 26 of the base portion, and the inner annular wall 50 captures the top ring 38F of the skirt spring 18. This arrangement permits the guide structure 20 to be slidably movable within the base portion 12 and to guide compression and expansion of the skirt spring 18.

The pump actuator 22 includes a top wall 54, downward depending sidewalls 56 and a dispensing orifice 58 with an internal conduit 60. The pump actuator 22 is received over the guide structure 20 and within the sidewall 26 of the base portion 12 where the internal conduit 60 of the dispensing orifice 58 communicates with the outlet orifice 52 of the guide structure 20 and the pump actuator 22 is slidably movable relative to the base portion 12.

In operation, forcible downward compression of the pump actuator 22 causes a corresponding downward sliding movement of the guide structure 20, a corresponding guided nesting compression of the skirt spring 18, a corresponding sliding movement of the inner piston wall 44 of the skirt spring 18 relative to the upper end 34 of the piston valve 16 to open the outlet valve and lastly a corresponding downward sliding movement of the piston valve 16 to force material within the flow conduit 30 to flow out through the outlet valve, through the outlet orifice 52 of the guide structure 20 and finally out through the dispensing orifice 58 of the pump actuator 22.

Upon the subsequent release of the pump actuator 22, the skirt spring 18 expands (return stroke) causing a forcible upward movement of the guide structure 20 and pump actuator 22, a corresponding sliding movement of the inner piston wall 44 of the skirt spring 18 relative to the upper end 34 of the piston valve 16 to close the outlet valve, and a corresponding upward sliding movement of the piston valve 16, which in turn creates a vacuum pressure within the flow conduit 30 drawing the inlet valve 14 upwardly from its normally closed position to its open position and drawing material into the flow conduit 30 through the inlet orifice 28.

When the skirt spring 18 returns to its fully expanded position, the flow conduit 30 is re-filled with material and vacuum pressure is reduced allowing the inlet valve 14 to return to its normally closed position.

It can therefore be seen that the exemplary embodiment may provide a unique dispensing pump which can be entirely constructed from plastic molded parts and thus easily recycled.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A polymer skirt spring for a dispensing pump comprising
a plurality of concentric nesting rings sequentially decreasing in diameter from a base ring to a top ring to form a conical shape
wherein adjacent rings are interconnected by spaced bridge segments, said bridge segments being staggered at each sequential ring, said skirt spring further including an upper wall extending inwardly from the top ring and an inner piston wall extending downwardly from the upper wall, and
wherein the upper wall further includes an upwardly extending annular projection configured and arranged to create a space for fluid to flow over when installed in the dispensing pump.

2. The skirt spring of claim 1 wherein the bridge segments comprise opposing bridge segments spaced 180 degrees apart.

3. The skirt spring of claim 2 wherein the opposing bridge segments are staggered 90 degrees at each sequential ring.

4. The skirt spring of claim 1 wherein said plurality of concentric nesting rings includes at least one intermediate ring between said base ring and said top ring.

5. The skirt spring of claim 4 wherein said intermediate ring is adjacent said top ring, and wherein said inner piston wall extends below said intermediate ring.

6. The skirt spring of claim 2 wherein said plurality of concentric nesting rings includes at least one intermediate ring between said base ring and said top ring.

7. The skirt spring of claim 6 wherein said intermediate ring is adjacent said top ring, and wherein said inner piston wall extends below said intermediate ring.

8. The skirt spring of claim 3 wherein said plurality of concentric nesting rings includes at least one intermediate ring between said base ring and said top ring.

9. The skirt spring of claim 8 wherein said intermediate ring is adjacent said top ring, and wherein said inner piston wall extends below said intermediate ring.

10. A polymer skirt spring for a dispensing pump comprising a plurality of concentric nesting rings sequentially decreasing in diameter from a base ring to a top ring to form a conical shape,
wherein adjacent rings are interconnected by spaced bridge segments,
wherein said bridge segments are staggered at each sequential ring,
wherein said bridge segments comprise opposing bridge segments spaced 180 degrees apart,
wherein said skirt spring further includes an upper wall extending inwardly from the top ring and an inner piston wall extending downwardly from the upper wall, and
wherein the upper wall further includes an upwardly extending annular projection configured and arranged to create a space for fluid to flow over when installed in the dispensing pump.

11. The skirt spring of claim 10 wherein said opposing bridge segments are staggered 90 degrees at each sequential ring.

12. The skirt spring of claim 10 wherein said plurality of concentric nesting rings includes at least one intermediate ring between said base ring and said top ring.

13. The skirt spring of claim 12 wherein said intermediate ring is adjacent said top ring, and wherein said inner piston wall extends below said intermediate ring.

14. The skirt spring of claim 11 wherein said plurality of concentric nesting rings includes at least one intermediate ring between said base ring and said top ring.

15. The skirt spring of claim 14 wherein said intermediate ring is adjacent said top ring, and wherein said inner piston wall extends below said intermediate ring.

16. A polymer skirt spring for a dispensing pump comprising a plurality of concentric nesting rings sequentially decreasing in diameter from a base ring to a top ring to form a conical shape,
wherein adjacent rings are interconnected by spaced bridge segments,
wherein said bridge segments are staggered at each sequential ring,
wherein said bridge segments comprise opposing bridge segments spaced 180 degrees apart,
wherein said opposing bridge segments are staggered 90 degrees at each sequential ring,
wherein said skirt spring further includes an upper wall extending inwardly from the top ring and an inner piston wall extending downwardly from the upper wall, and
wherein the upper wall further includes an upwardly extending annular projection configured and arranged to create a space for fluid to flow over when installed in the dispensing pump.

17. The skirt spring of claim 16 wherein said plurality of concentric nesting rings includes at least one intermediate ring between said base ring and said top ring.

18. The skirt spring of claim 17 wherein said intermediate ring is adjacent said top ring, and wherein said inner piston wall extends below said intermediate ring.

\* \* \* \* \*